United States Patent
Sandstrom

(10) Patent No.: US 7,131,474 B2
(45) Date of Patent: Nov. 7, 2006

(54) TIRE WITH RUBBER TREAD OF LOAD BEARING CENTRAL AND LATERAL ZONES

(75) Inventor: Paul Harry Sandstrom, Cuyahoga Falls, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 123 days.

(21) Appl. No.: 10/317,333

(22) Filed: Dec. 12, 2002

(65) Prior Publication Data

US 2004/0112490 A1    Jun. 17, 2004

(51) Int. Cl.
B60C 1/00      (2006.01)
B60C 11/00     (2006.01)
B60C 19/08     (2006.01)

(52) U.S. Cl. ............... 152/152.1; 152/209.5; 152/DIG. 2

(58) Field of Classification Search ........... 152/152.1, 152/154.2, 209.5, DIG. 2, 209.18
See application file for complete search history.

(56) References Cited

U.S. PATENT DOCUMENTS

| | | | | |
|---|---|---|---|---|
| 4,319,620 A * | 3/1982 | Knill | ............ | 152/209.5 |
| 4,385,653 A | 5/1983 | Okazaki et al. | ............ | 152/209 |
| 5,026,762 A * | 6/1991 | Kida et al. | ............ | 524/495 |
| 5,082,901 A * | 1/1992 | Linster | ............ | 525/237 |
| 5,225,011 A | 7/1993 | Takino et al. | ............ | 152/209 |
| 5,300,577 A * | 4/1994 | DiRossi et al. | ............ | 525/237 |
| 5,518,055 A | 5/1996 | Teeple et al. | ............ | 152/152.1 |
| 5,872,178 A | 2/1999 | Kansupada et al. | ............ | 524/496 |
| 5,882,456 A | 3/1999 | Kohne | ............ | 056/129 |
| 5,937,926 A * | 8/1999 | Powell | ............ | 152/209.5 |
| 5,942,069 A | 8/1999 | Gerresheim et al. | ............ | 156/128.1 |
| 6,014,998 A * | 1/2000 | Mowdood et al. | ............ | 152/564 |
| 6,044,882 A | 4/2000 | Crawford et al. | ............ | 152/152.1 |
| 6,046,266 A * | 4/2000 | Sandstrom et al. | ............ | 524/492 |
| 6,140,407 A | 10/2000 | Naito et al. | ............ | 524/496 |
| 6,415,883 B1 | 7/2002 | Komatsu | ............ | 152/152.1 |
| 6,474,382 B1 * | 11/2002 | Finck | ............ | 152/209.5 |
| 6,523,585 B1 * | 2/2003 | Ducci et al. | ............ | 152/209.5 |

(Continued)

FOREIGN PATENT DOCUMENTS

EP    341187    * 11/1989

(Continued)

OTHER PUBLICATIONS

Abstract for Europe 1308319.*

(Continued)

Primary Examiner—Steven D. Maki
(74) Attorney, Agent, or Firm—Henry C. Young, Jr.

(57) ABSTRACT

The invention relates to a tire having a rubber tread comprised of cap/base construction where the tread cap layer is the load-bearing running surface of the tread having a lug and groove configuration and the tread base layer underlies the tread cap layer wherein the base layer is a transition zone between the tread cap and remainder of the tire carcass and is not intended to be a running surface of the tread. The tread cap layer is comprised of three distinct load-bearing zones, namely a circumferential annular central rubber zone positioned between two lateral and peripheral circumferential annular rubber zones, each zone extending from a tread base carbon black-rich rubber composition to and including said tire tread running surface, wherein the rubber compositions of each of said zones contain both carbon black and silica reinforcement. In one aspect, said central zone is of a silica-rich rubber composition and said lateral zones are of a carbon black-rich composition. In another aspect, said central zone is of a carbon black-rich rubber composition and said lateral zones are of a silica-rich rubber composition.

8 Claims, 2 Drawing Sheets

U.S. PATENT DOCUMENTS

Figure 1:
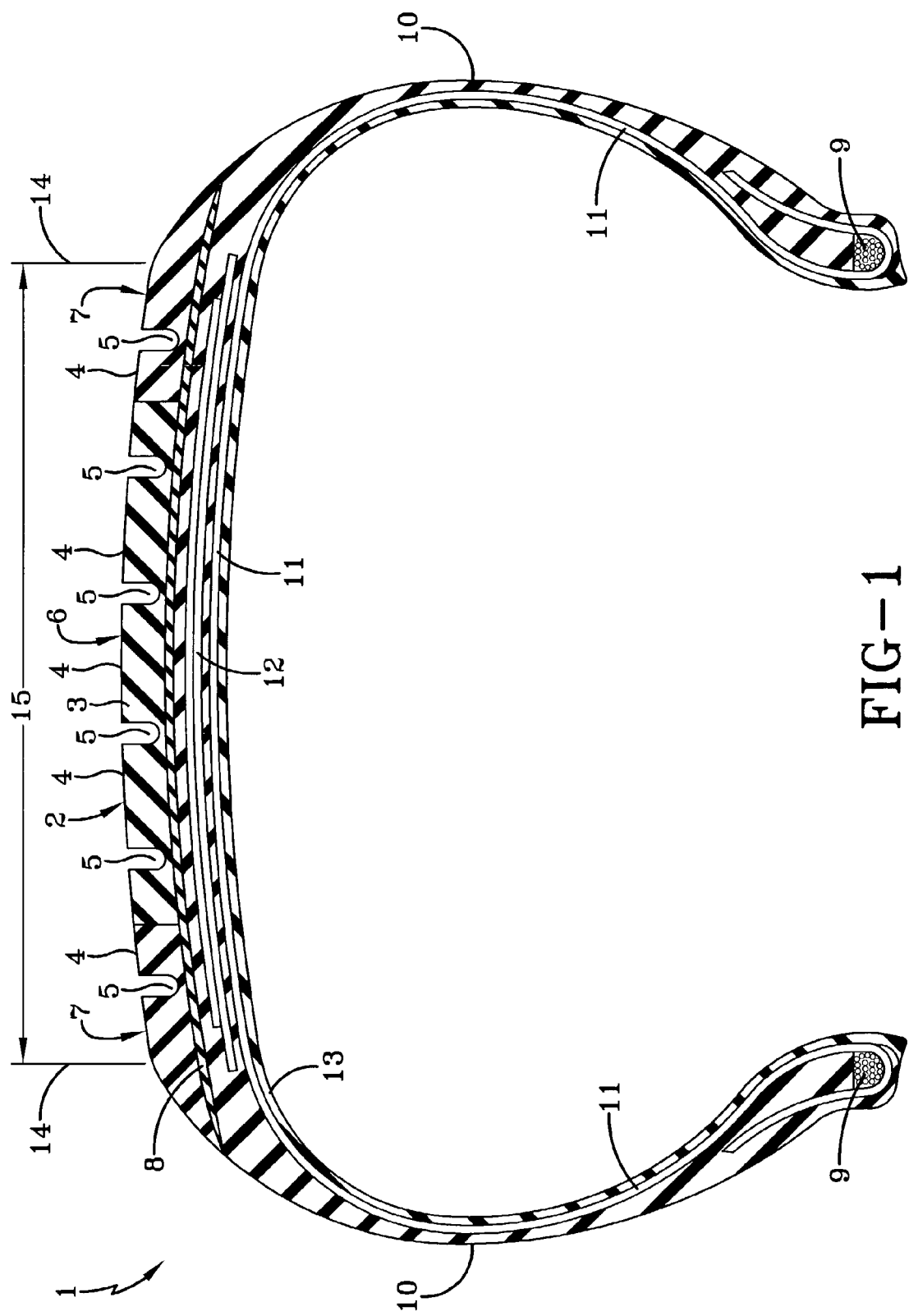

2002/0033212 A1    3/2002  Caretta et al. ........... 152/209.5
2004/0118495 A1*   6/2004  Sandstrom et al. ...... 152/209.5

FOREIGN PATENT DOCUMENTS

| EP | 0662396 |   | 7/1995  |
|----|---------|---|---------|
| EP | 738613  | * | 10/1996 |
| EP | 0839675 |   | 5/1998  |
| EP | 0864446 |   | 9/1998  |
| EP | 1308319 |   | 5/2003  |
| JP | 2001-47815 | * | 2/2001 |
| WO | 9901299 |   | 1/1999  |
| WO | 0037270 |   | 6/2000  |

OTHER PUBLICATIONS

Abstract for 839675.*
Patent Abstracts of Japan, Application No. 58243602, Publication Date Jul. 18, 1985.
European Search Report.

* cited by examiner

TIRE WITH RUBBER TREAD OF LOAD BEARING CENTRAL AND LATERAL ZONES

FIELD OF THE INVENTION

The invention relates to a tire having a rubber tread comprised of cap/base construction where the tread cap layer is the load-bearing running surface of the tread having a lug and groove configuration and the tread base layer underlies the tread cap layer wherein the base layer is a transition zone between the tread cap and remainder of the tire carcass and is not intended to be a running surface of the tread. The tread cap layer is comprised of three distinct load-bearing zones, each comprising a significant portion of the tread running surface, namely a circumferential annular central rubber zone positioned between two lateral and peripheral circumferential annular rubber zones, each zone extending from a tread base carbon black-rich rubber composition to and including said tire tread running surface, wherein the rubber compositions of each of said zones contain both carbon black and silica reinforcement. In one aspect, said central zone is of a silica-rich rubber composition and said lateral zones are of a carbon black-rich composition. In another aspect, said central zone is of a carbon black-rich rubber composition and said lateral zones are of a silica-rich rubber composition.

BACKGROUND FOR THE INVENTION

Pneumatic tires sometimes have treads of a running surface comprised of a carbon black-rich rubber composition or of a silica-rich rubber composition.

Pneumatic tires having treads of a running surface comprised of a silica-rich rubber composition, while sometimes desirable to impart various physical properties to the tire tread such as, for example reduced rolling resistance and suitable traction, may be disadvantageous because of the relatively high ratio of silica to carbon black in the reinforcing filler content. Such high silica/carbon black ratio represents a significant increase in cost of the silica-rich tread in terms of increased material cost (the silica) and increased cost of processing the silica-rich rubber composition. Further, such silica-rich tread rubber, with its minimal carbon black content, is of a relatively low electrical conductivity and is therefore electrically resistive to conducting static electricity from the tire tread to the ground.

Sometimes a path of increased electrical conductivity for a silica-rich tread may be provided, for example, by positioning a strip of a carbon black rich rubber composition either as a thin cover strip over a portion of the running surface of the tread or as a thin, non load bearing, strip extending through the body of the tread to its running surface. Methods of such type add both cost and complexity to the tire itself and to the manufacturing procedure for the tire.

For this invention, in order to both reduce the material and fabrication cost of a silica-rich tread and to provide a path of increased electrical conductivity from the tire through its tread to the ground, it is envisioned that the tread running surface be divided into three distinct load bearing zones which include at least one silica-rich load bearing zone and at least one carbon black-rich load bearing zone of rubber compositions.

Historically, a tire tread has heretofore been suggested having a running surface composed of three longitudinal portions namely, two black colored lateral portions and a non-black colored central portion located between the two black portions, wherein the lateral black colored portions have wear resistant properties virtually identical to the central colored portion (EP 0 993 381 A3, FR 2765525 and WO 99/01299 patent publications).

However, for this invention, it is desired to provide a tire tread of three distinct, and significantly wide, circumferential load-bearing zones, each of which contain carbon black reinforcement and are thereby black in color.

Historically, U.S. Pat. No. 5,225,011 relates to a tire having a tread composed of a center rubber composition and side rubbers (FIG. 1) positioned directly onto a tire carcass belt without a tread base transition layer. The center rubber is required to be limited to either natural rubber or a natural rubber/styrene-butadiene rubber blend. The center rubber contains a carbon black of large iodine absorption number of at least 100 mg/g, silica and silane coupling agent and the side rubbers are required to be of a different rubber composition.

Historically, European patent publication number EP 864, 446 A1 relates to a tire having a tread (FIG. 2) with a central portion (B) and side portions (A) positioned directly onto a tire carcass belt without a tread base transition layer. The side portions are carbon black rich and the central portion is silica rich, wherein the silica content of the central portion (B) is at least 20 percent higher than in the side portions (A).

For the zoned tread of this invention, by requiring the tread cap zones to be load-bearing, it is meant that each of the three distinct running surface tread cap zones extend from the outer surface of the tread to the underlying carbon black-rich tread base rubber composition so that all of the load on the tire is communicated by each of the three tread cap layer zones directly to the tread base layer instead of directly to remainder of the tire carcass itself.

By requiring that each of the running surface tread zones be significantly wide, and therefore each comprising a significant portion of the tread running surface, it is intended that each respective zone more effectively transmits the load from the outer surface of the running surface of the tire to the tread base layer. For such purpose of this invention, the silica-rich zone, or zones, comprise from about 55 to about 80 percent of the width of the of the tread cap and, correspondingly, the carbon black-rich zone, or zones, comprise from about 20 to about 45 percent of the width of the tread cap.

It is an additional aspect of the zoned tread configuration of this invention that the tread running surface of the load bearing carbon black-rich zone(s) provide a path of increased electrical conductivity from the tire to the ground.

Such structural, zoned, load-bearing, configuration of a tire tread running surface is considered herein to be a substantial improvement of providing a tread with a path of increased electrical conductivity to the tread running surface (the tread surface intended to be ground-contacting) from the carbon black rich tread base layer without resorting to, for example, providing a narrow strip of electrically conductive rubber through an electrically insulative tread running surface (e.g silica-rich tread cap surface) or providing a thin layer of electrically conductive rubber composition over a portion of the outer surface of the tread cap running surface or providing a thin layer of electrically conductive rubber composition around a periphery of a silica rich tread. Such layers are typically required to be thin in order to not unnecessarily interfere with the performance of the basic tire tread running surface. For example, see U.S. Pat. Nos. 5,942,069, 6,044,882, 5,872,178, 6,415,833, 6,140,407, 5,518,055 and 5,882,456. However, such thin layers are not considered herein to be significantly load-bearing in the manner required by the substance of the respective, relatively wide, distinct tread cap zones of this invention for transmitting significant loads from the running surface of the tread to the underlying tread base layer.

It is considered herein that utilization of such thin layers, or strips, of electrically conductive rubber compositions unnecessarily add to the cost and complexity of the tire tread and its process of fabrication.

Therefore, in one aspect of the invention, it preferred that the tread cap layer is exclusive of a thin, electrically conductive, carbon black rich rubber strip positioned through the tread cap layer, such as from a carbon black rich tread base through a more electrically resistive tread cap silica rich rubber composition based zone; over the tread cap rubber layer and therefore between the tread cap rubber layer and the ground; or around the tread cap rubber layer extending from a portion of its running surface to a carbon black rich component of the tire such as for example a tread base layer or a tire sidewall.

In the description of this invention, the terms "rubber" and "elastomer" where used herein, are used interchangeably, unless otherwise provided. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" refers to parts of a respective material per 100 parts by weight of rubber, or elastomer. The terms "rubber" and "elastomer" may be used interchangeably unless otherwise provided. The terms "cure" and "vulcanize" may be used interchangeably unless otherwise provided.

In the description of this invention, the elastomer Tg may be determined by differential scanning calorimeter (DSC), an industry standard test, at a heating rate of 10° C. per minute.

SUMMARY AND PRACTICE OF THE INVENTION

In accordance with this invention, a tire is provided having a rubber tread of a co-extruded cap/base construction, wherein said tread cap is of a lug and groove configuration as a running surface of the tread, wherein said tread base underlies said tread cap and is comprised of a layer of carbon black-rich rubber composition and wherein said tread cap is composed of three distinct, annular, circumferential zones, wherein said tread zones are comprised of a central tread zone positioned between two lateral tread zones, wherein said tread cap zones extend from the running surface of the tread to said tread base layer, wherein, based upon parts by weight per 100 parts by weight rubber (phr):

(A) said tread base layer is comprised of at least one conjugated diene-based elastomer and from about 30 to about 70 phr of rubber reinforcing filler selected from carbon black and precipitated silica wherein said filler is comprised of from about 30 to about 70 phr of said carbon black and from zero to 25 phr of said precipitated silica, (thus, in one aspect, the rubber reinforcing filler may be entirely rubber reinforcing carbon black); and wherein (B) said individual tread cap zones are composed of:

(1) a silica-rich central tread cap zone comprised of at least one conjugated diene-based elastomer and reinforcing filler comprised of about 50 to about 80 phr of precipitated silica and from about 10 to about 40 phr of carbon black positioned between two carbon black rich lateral zones comprised of at least one conjugated diene-based elastomer and reinforcing filler comprised of from about 50 to about 80 phr of carbon black and from zero to about 40, alternately about 10 to about 25, phr of precipitated silica, wherein said silica-rich central tread zone extends over about 55 percent to about 80 percent of the span (axial width) of the running surface of said tread cap, thus a major portion of the running surface of said tread cap, and, correspondingly, said carbon black-rich lateral zones collectively extend over from about 20 to about 45 percent of the span (axial width) of the running surface of said tread cap, thus a minor portion of the running surface of said tread cap, wherein the widths of said two individual lateral zones are within about 80 to about 120 percent of each other and preferably are of substantially equal widths; or (2) a carbon black-rich central tread zone comprised of at least one conjugated diene-based elastomer and reinforcing filler comprised of about 50 to about 80 phr of carbon black and from zero to about 40, alternately from about 10 to about 25, phr of precipitated silica positioned between two silica-rich lateral zones comprised of at least one conjugated diene-based elastomer and reinforcing filler comprised of from about 50 to about 80 phr of precipitated silica and from about 10 to about 40 phr of carbon black, wherein said carbon black-rich central tread zone extends over about 20 to about 45 percent of the span (axial width) of the running surface of said tread cap and, correspondingly, said silica-rich lateral zones collectively extend over from about 55 to about 80 percent of the span (axial width) of the running surface of said tread cap and wherein the widths of said two individual lateral zones are within about 80 to about 120 percent of each other and preferably are of substantially equal widths;

wherein said span of the running surface of said tread cap is the axial width of the tread cap inclusive of the surface of said tread lugs intended to be ground-contacting and said tread grooves included between said lugs;

wherein said tread cap zone rubber composition(s), and said tread base layer, when said precipitated silica is present, contain a coupling agent having a moiety reactive with hydroxyl groups (e.g. silanol groups) contained on the surface of said precipitated silica and another moiety interactive with said conjugated diene based elastomer(s);

wherein said central and lateral tread cap zones are of rubber compositions having a low strain modulus G' value at 30° C., 10 percent strain and 10 hertz in a range of from about 1 to about 50 MPa, a tan delta value at 60° C., 10 percent strain and 10 hertz in a range of from about 0.05 to abut 0.20, and a tan delta value at 0° C., 10 percent strain and 10 hertz in a range of from about 0.12 to abut 0.50.

In practice, the said tread cap zones and underlying tread base layer are co-extruded together to form an integral and unified tread composite thereof.

In practice, said two individual lateral tread zones may be of equal widths, or at least of substantially equal widths, or may be asymmetrical in a sense that they are of unequal widths, namely of widths within about 80 to about 120 percent of each other.

A significant aspect of the invention is the significantly transversally (axially) wide individual circumferential load bearing tread cap zones which are also required to extend radially from the tread cap running surface to the supportive tread base layer rather than more simply only extending directly to the tire carcass and particularly to a tire carcass belt layer, which thereby enables the preparation of a tire of a silica-rich tread running surface with significantly reduced material cost insofar as filler reinforcement is concerned and which also enables a suitable, load-bearing path of electrical conductivity via the tread cap zone(s) which is/are of a carbon black rich rubber composition.

The electrical conductivity aspect of at least one of said load bearing tread cap zones is considered herein as being significant because a need for a thin strip, or thin layer, of electrically conductive rubber which extends through or around the tread cap to connect the tread cap running surface with a carbon black tread base is eliminated so that in one aspect, the tread of this invention, as hereinbefore discussed, is intended to be exclusive of such thin rubber strips or layers of electrically conductive rubber composition which extend through or around the tread of a rubber composition of low electrical conductivity to the running surface of the tread.

Therefore, the invention is directed to a structural configuration of a tire tread combined with significantly beneficial, distinct, zoned, rubber compositions for the running surface of the tread.

Providing the tread cap zones with the low strain modulus G' value in a range of from about 1 to about 50 MPa is considered herein to be significant because it is considered herein as representing a rubber composition to promote handling and resistance to wear of a tire having a tread composed of a zone of the tread cap rubber composition.

Providing a tread cap zone with the tan delta value at a low 10 percent strain at 10 hertz at 60° C. in a range of about 0.05 to about 0.20 is considered herein as being significant because it is considered herein as representing a rubber composition to promote reduced rolling resistance of a tire having a tread composed of a zone of the tread cap rubber composition.

Providing a tread cap zone with the tan delta value at a low 10 percent strain at 10 hertz at 0° C. in a range of about 0.12 to about 0.50 is considered herein as being significant because it is considered herein as representing a rubber composition to promote traction of a tire having a tread composed of a zone of the tread cap rubber composition.

For the purposes of this invention, the low shear modulus property G' value is a viscoelastic property of a rubber composition which may be suitably determined by a Rheometrics Dynamic Spectrometer instrument from the Rheometrics company as RDS 7700 Series II referred to herein as an "RDS" instrument. The RDS instrument uses dynamic mechanical analysis to evaluate rubber compositions. A sinusoidally oscillating shear deformation is used as an operating mode. For determination of the aforesaid G' value, a sample of the respective rubber composition is subjected to a precisely controlled deformation (10 percent strain), frequency (10 Hertz) and temperature (30° C.) and the sample stress response is observed by the instrument. The observed sample response can be separated, by the instrument, into viscous (G") and elastic (G') components. For the purposes of this specification, the aforesaid testing conditions for the instrument were 10 percent strain, 10 Hertz and 30° C. to define the G' elastic low shear property in terms of MPa.

One having skill in the pertinent art would understand how to provide rubber compositions of various low shear properties (at 10 percent strain at 10 Hertz at 30° C.) pursuant to the requirements of the tread cap zone rubber composition for this invention composed of the aforesaid elastomers and reinforcing fillers by routine experimentation and without undue experimentation.

For the purposes of this invention, the tan delta property at 0° C. and at 60° C. may also be determined by the aforesaid RDS instrument and one having skill in the pertinent art would understand how to provide rubber compositions of the respective tan delta values pursuant to the requirements of the tread cap zone rubber composition for this invention composed of the aforesaid elastomers and reinforcing fillers by routine experimentation and without undue experimentation.

Figure 2:
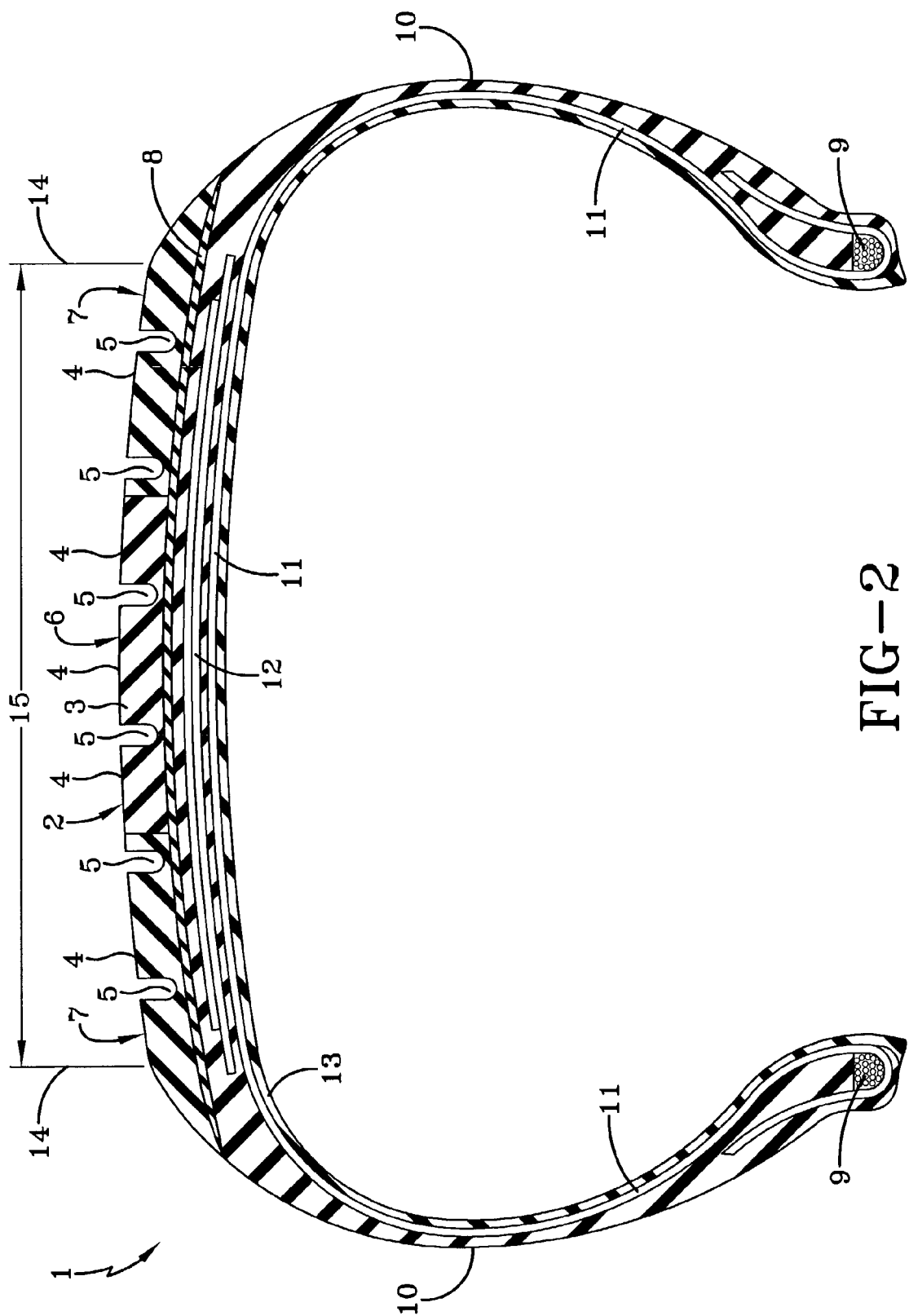

For a further understanding of this invention, FIG. 1 (FIG. 1) and FIG. 2 (FIG. 2) are provided as partial cross-sectional views of a tire having a tread of a cap/base construction.

FIG. 1 and FIG. 2 depict a tire (1) having a tread (2) comprised of a tread cap layer (3) of a lug (4) and groove (5) construction and underlying tread base layer (8) as a transition zone between said tread cap layer (3) and remainder of the tire carcass plies (11) and rubber encapsulated belt layer (12), spaced apart relatively inextensible beads (9) carcass plies as rubber encapsulated fabric reinforced plies extending between said beads (9) and sidewalls (10) extending between said beads (9) and peripheral edges of said tread (2) as well as a rubber innerliner layer (13).

Said tread cap layer (3) is comprised of three annular, circumferential zones of rubber compositions comprised of a central zone (6) positioned between two individual lateral zones (7).

The three zones of the cap layer (3) also extend radially inward from the running surface (14—14) which is the spanned region (15) of the tread cap layer (3) to the transition, intervening, tread base layer (8) and not directly to the remainder of the carcass plies (11) or carcass belt layer (12).

In particular, said central zone (6) and lateral zones (7) constitute the running surface of the tire normally intended to be ground contacting and normally extending between positions 14 and 14 as illustrated as spanning the region (15) of the tread cap layer (3). In particular, for the purposes of this invention in order to more effectively describe and allocate the central zone (6) and lateral zones (7) of the tread cap layer (3), the running surface of the tire tread, to include the central zone (6) and lateral zones (7) is therefore intended to be the spanned region (15) to axially span across (include) the outer surfaces of the lugs (4) which are intended to be ground contacting and the associated grooves (5) between the respective lugs (4) even though the grooves (5) themselves are not normally intended to be ground contacting.

For FIG. 1, the central zone (6) is depicted as constituting about 60 percent of the axially spanned running surface (15) of the tire tread (2) and the two individual lateral zones (7) individually constituting about 20 percent, for a total of 40 percent, of the axially spanned running surface (15) of the tire tread (2).

For FIG. 2, the central zone (6) is depicted as constituting about 40 percent of the axially spanned running surface (15) of the tire tread (2) and the two individual lateral zones (7) individually constituting about 30 percent, for a total of 60 percent, of the axially spanned running surface (15) of the tire tread (2).

In practice, the tread cap zone layers may be comprised of the same or different elastomers in combination with the aforesaid differentiated combinations of reinforcing fillers so long as the aforesaid combination of low strain modulus G', tan delta at 60° C. and tan delta at 0° C. ranges of rubber property values are met.

Preferably, the tread cap zone layers are comprised of at least two elastomers wherein the elastomers are comprised of at least one high Tg elastomer having a Tg above −50° C. and at least one low Tg elastomer having a Tg below −50° C.

Preferably the weight ratio of elastomers having a high Tg above −50° C. to low Tg elastomers having a Tg below −50° C. is in a range of from 20/80 to about 80/20.

Representative of such low Tg conjugated diene elastomers are, for example and so long as they have a Tg below −50° C. are, for example, cis 1,4-polybutadiene, cis 1,4-polyisoprene, styrene/butadiene (whether prepared by emulsion polymerization or organic solvent polymerization of the styrene and 1,3-butadiene monomers), and isoprene/butadiene elastomers. Such elastomers are usually beneficial to promote resistance to tread wear and reduced rolling resistance for the tire tread.

Representative of such high Tg conjugated diene elastomers are, for example and so long as they have a Tg above −50° C. are, for example, high vinyl polybutadiene elastomers having a vinyl content in a range of about 50 to about 90 percent, 3,4-polyisoprene, high vinyl styrene/butadiene elastomers having a vinyl content in a range of about 30 to about 90 percent, based upon the butadiene content and high styrene styrene/butadiene elastomers having a bound styrene content in a range of about 30 to about 70 percent based upon the styrene/butadiene elastomer. Such elastomers are usually beneficial to promote traction for the tire tread.

The above combination of high Tg and low Tg elastomers are to be used for the tread cap respective zones so long as aforesaid G' value, and tan delta values of the rubber composition for the respective tread cap zones is met.

Thus, while the elastomer component of the central and two lateral zones of the tread cap may be of the same or different elastomers, the reinforcing filler composition for the central zone are very different from the two lateral zones.

In practice, the tread base layer rubber composition is preferably comprised of either cis 1,4-polyisoperene rubber, preferably natural rubber or a blend of the cis 1,4-polyisoprene rubber and cis 1,4-polybutadiene having a cis 1,4-content of greater than 90 percent and/or trans 1,4-polybutadiene having a trans 1,4-content of greater than 50 percent, preferably the cis 1,4-polybutadiene rubber. The tread base rubber composition may also optionally contain up to about 20 phr of an additional conjugated diene based elastomer such as, for example, styrene/butadiene rubber, whether prepared by aqueous emulsion polymerization or organic solution polymerization.

In practice, the coupling agent for the central portion of the tread and tread base layer, where the precipitated silica is present, may be, for example, an alkoxysilyl polysulfide such as for example, a bis(3-trialkoxysilylalkyl) polysulfide wherein alkyl radicals for said alkoxy groups are selected from one or more of methyl and ethyl radicals, preferably an ethyl radical and the alkyl radical for said silylalkyl component is selected from butyl, propyl and amyl radicals, preferably a propyl radical and wherein said polysulfide component contains from 2 to 8, with an average of from 2 to 2.6 or an average of from 3.5 to 4, connecting sulfur atoms in its polysulfidic bridge, preferably an average of from 2 to 2.6 connecting sulfur atoms to the exclusion of such polysulfides having greater than 2.6 connecting sulfur atoms.

Representative of such coupling agents are, for example, bis(3-triethoxysilylpropyl) polysulfide having an average of from 2 to 2.6 or an average of from 3.5 to 4, connecting sulfur atoms in its polysulfidic bridge, preferably an average of from 2 to 2.6 connecting sulfur atoms to the exclusion of a bis(3-triethoxysilanepropyl) polysulfide containing an average of greater than 2.6 connecting sulfur atoms in its polysulfidic bridge.

Representative examples of other silica couplers may be organomercaptosilanes such as, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

Such coupling agent may, for example, be added directly to the elastomer mixture or may be added as a composite of precipitated silica and such coupling agent formed by pretreating a precipitated silica therewith prior to addition to the elastomers or by treating a colloidal silica therewith and precipitating the resulting composite.

In practice, the synthetic amorphous precipitated silica is in a form of aggregates of elemental silica particles, as is well known to one having skill in such art and, for the purposes of this invention, the term "precipitated silica" is intended to include precipitated aluminosilicates as a co-precipitated silica and aluminum.

Precipitated silica is, in general, well known to those having skill in such art. For example, precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

Thus, the precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram ($m^2$/g). The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3$/100 g, and more usually about 100 to about 300 $cm^3$/100 g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from J. M. Huber Corporation as, for example, Zeopol 8745 and Zeopol 8715, silicas from Degussa A G with, for example, designations VN2, VN3 and Ultrasil 7005 as well as other grades of silica, particularly precipitated silicas, which can be used for elastomer reinforcement.

In the practice of the invention, the rubber compositions may be suitably prepared, for example, in a sequential series of at least two separate and individual preparatory internal rubber mixing steps, or stages, in which the diene-based elastomer is first mixed with the prescribed carbon black and/or silica in a subsequent, separate mixing step and followed by a final mixing step where curatives are blended at a lower temperature and for a substantially shorter period of time.

It is conventionally required after each mixing step that the rubber mixture is actually removed from the rubber mixer and cooled to a temperature of less than 40° C. and, for example, in a range of about 40° C. to about 20° C. and then added back to an internal rubber mixer for the next sequential mixing step, or stage.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

It is readily understood by those having skill in the art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least three stages, namely, at least two sequential non-productive (preparatory) stages followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a rubber tread of a co-extruded cap/base construction, wherein said tread cap is of a lug and groove configuration as a running surface of the tread, wherein said tread base underlies said tread cap and is comprised of a layer of carbon black-rich rubber composition and wherein said tread cap is composed of three distinct, annular, individual circumferential zones, wherein said tread zones are comprised of a central tread zone positioned between two lateral tread zones, wherein said tread cap zones extend from the running surface of the tread to said tread base layer, wherein, based upon parts by weight per 100 parts by weight rubber (phr):

(A) said tread base layer is comprised of at least one conjugated diene-based elastomer and from about 30 to about 70 phr of rubber reinforcing filler consisting essentially of carbon black and wherein (B) said individual tread cap zones are composed of a carbon black-rich central tread zone comprised of at least one conjugated diene-based elastomer and reinforcing filler comprised of about 50 to about 80 phr of carbon black and from about 10 to about 25 phr of precipitated silica positioned between two silica-rich lateral zones comprised of at least one conjugated diene-based elastomer and reinforcing filler comprised of from about 50 to about 80 phr of precipitated silica and from about 10 to about 40 phr of carbon black, wherein said carbon black-rich central tread zone extends over about 20 to about 45 percent of the axial width of the span of the running surface of said tread cap and, correspondingly, said silica-rich lateral zones collectively extend over from about 55 to about 80 percent of the axial width of the span of the running surface of said tread cap and wherein the widths of said two individual lateral zones are within about 80 to about 120 percent of each other;

wherein said span of said running surface of said tread cap is the axial width of the tread cap inclusive of the surface of said tread lugs intended to be ground-contacting and said tread grooves included between said lugs;

wherein said tread cap zones contain a coupling agent having a moiety reactive with hydroxyl groups contained on the surface of said precipitated silica and another moiety interactive with said conjugated diene based elastomer(s);

wherein said central and lateral tread cap zones have a low strain modulus G' value at 30° C., 10 percent strain and 10 hertz in a range of from about 1 to about 50 MPa, a tan delta value at 60° C., 10 percent strain and 10 hertz in a range of from about 0.05 to abut 0.20, and a tan delta value at 0° C., 10 percent strain and 10 hertz in a range of from about 0.12 to abut 0.50;

wherein said tread cap zone layers are comprised of the same or different elastomers, wherein said tread cap zone layers are comprised of at least two elastomers, wherein at least one of said elastomers is a high Tg elastomer having a high Tg above −50° C. and at least one of said elastomers is a low Tg elastomer having a low Tg below −50° C. and wherein the weight ratio of said high Tg elastomer(s) and said low Tg elastomer(s) is in a range of from 20/80 to about 80/20, and wherein said low Tg elastomer(s) is selected from at least one of cis 1,4-polybutadiene, cis 1,4-polyisoprene, styrene/butadiene and isoprene/butadiene elastomers; and wherein said high Tg elastomer(s) is selected from at least one of high vinyl polybutadiene elastomers having a vinyl content in a range of about 50 to about 90 percent, 3,4-polyisoprene, high vinyl styrene/butadiene elastomers having a vinyl content in a range of about 30 to about 90 percent, based upon the butadiene content and high styrene styrene/butadiene elastomers having a bound styrene content in a range of about 30 to about 70 percent based upon the styrene/butadiene elastomer, so long as said G' value, and tan delta values of the rubber composition for the respective tread cap zone is met.

2. The tire of claim 1 wherein said tread cap zones and underlying tread base layer are co-extruded together to form an integral and unified tread composite thereof, wherein the tread cap zones extend radially inward from the outer surface of the tread lugs intended to be ground contacting to the tread base and wherein said tread base is an intervening layer between said tread cap zones and tire carcass.

3. The tire of claim 2 wherein said carbon black rich tread zone provide an electrically conductive path from said carbon black rich tread base layer to the running surface of said carbon black rich tread zone and wherein said tread cap is exclusive of a thin carbon black rich, electrically conductive, rubber strip extending through said tread cap to the running surface of the tread cap or extending from the running surface of the tread cap to the tread base or tire sidewall.

4. The tire of claim 1 wherein said two individual lateral tread cap zones are of substantially equal widths.

5. The tire of claim 1 wherein said tread base layer rubber composition is a carbon black rich rubber composition comprised of:

(A) cis 1,4-polyisoprene rubber, or (B) blend of cis 1,4-polyisoprene rubber and polybutadiene rubber selected from at least one of cis 1,4-polybutadiene rubber having a cis 1,4-content of greater than 90 percent, and trans 1,4-polybutadiene rubber having a trans 1,4-content of greater than 50 percent, in a weight ratio of cis 1,4-polyisoprene rubber to said polybutadiene rubber in a range of from about 20/80 to about 80/20, and wherein said reinforcing filler is carbon black.

6. The tire of claim 5 wherein the rubber of said tread base rubber composition is natural cis 1,4-polyisoprene rubber.

7. The tire of claim 5 wherein the rubber of said tread base rubber composition is a blend of cis 1,4-polyisoprene rubber and at least one of cis 1,4-polybutadiene rubber and trans 1,4-polybutadiene rubber.

8. The tire of claim 5 where said tread base rubber composition contains up to 20 phr of a styrene/butadiene rubber.

* * * * *